United States Patent
Plantamura

(10) Patent No.: US 7,427,914 B2
(45) Date of Patent: Sep. 23, 2008

(54) OPERATOR ALERTING SYSTEM USING A VEHICLE FAULT CONDITION PRIORITIZATION METHOD

(75) Inventor: Louis Gino Plantamura, Peoria, IL (US)

(73) Assignee: Komatsu America Corp., Peorioa, IL (US)

( * ) Notice: Subject to any disclaimer, the term of this patent is extended or adjusted under 35 U.S.C. 154(b) by 216 days.

(21) Appl. No.: 11/524,443

(22) Filed: Sep. 21, 2006

(65) Prior Publication Data

US 2008/0074247 A1    Mar. 27, 2008

(51) Int. Cl.
*B60Q 1/00*    (2006.01)

(52) U.S. Cl. .............. 340/438; 340/425.5; 340/426.1; 340/426.13; 340/426.15; 340/691.3

(58) Field of Classification Search ............... 340/438, 340/425.5, 426.1, 428, 506, 426.13, 426.15, 340/426.18, 691.3
See application file for complete search history.

(56) References Cited

U.S. PATENT DOCUMENTS

| | | | |
|---|---|---|---|
| 4,015,237 A | 3/1977 | Takatani et al. | |
| 4,184,146 A | 1/1980 | Fratzke et al. | |
| 4,247,846 A | 1/1981 | Zedler | |
| 4,280,457 A * | 7/1981 | Bloxham | 123/198 R |
| 5,768,119 A | 6/1998 | Havekost et al. | |
| 5,941,918 A * | 8/1999 | Blosser | 701/29 |
| 6,002,347 A | 12/1999 | Daly et al. | |
| 6,397,133 B1 * | 5/2002 | van der Pol et al. | 701/37 |
| 6,700,482 B2 | 3/2004 | Ververs et al. | |
| 6,774,786 B1 | 8/2004 | Havekost et al. | |
| 6,933,839 B2 | 8/2005 | Henry | |
| 7,082,359 B2 | 7/2006 | Breed | |

* cited by examiner

*Primary Examiner*—Daryl C Pope
(74) *Attorney, Agent, or Firm*—Wenderoth, Lind & Ponack, L.L.P.

(57) ABSTRACT

In a system for alerting an operator of a vehicle to a highest priority fault condition, the operating conditions of the vehicle are obtained and compared to predetermined values in order to identify the fault conditions of the vehicle. Each of the fault conditions of the vehicle has a corresponding operator action associated therewith which identifies the actions that must be performed by the operator in order to manage the fault condition. By prioritizing the fault conditions on the basis of the operator actions that are necessary to manage the faults, the system is able to output to the operator only the operator action associated with the highest priority fault condition, without any compromise in safety or additional risk of damage to the vehicle, while providing the ability for the operator of the vehicle to manage all of the active fault conditions by performing only the operator action associated with the highest priority fault condition.

17 Claims, 3 Drawing Sheets

FIG. 2

| Fault Condition | Priority Level | Operator Actions |
|---|---|---|
| "A" | 1 | STOP, PARK, SHUTDOWN, ACTION A |
| "B" | 2 | STOP, PARK, SHUTDOWN, ACTION B |
| "C" | 3 | STOP, PARK, SHUTDOWN |
| "D" | 4 | STOP, PARK, ACTION C |
| "E" | 5 | STOP, PARK, ACTION D |
| "F" | 6 | STOP, PARK |
| "G" | 7 | STOP, ACTION E |
| "H" | 8 | STOP, ACTION F |
| "I" | 9 | ACTION G |
| "J" | 10 | ACTION H |

OPERATOR ALERTING SYSTEM USING A VEHICLE FAULT CONDITION PRIORITIZATION METHOD

BACKGROUND OF THE INVENTION

1. Field of the Invention

The present invention relates to a system for alerting an operator of a vehicle to only a highest priority fault condition. More particularly, the present invention relates to a system for alerting an operator to only the highest priority vehicle fault condition by utilizing a prioritization method that is based upon operator actions. This system allows the operator of the vehicle to manage all of the active vehicle fault conditions by performing a single operator action instruction.

2. Related Art

Conventional fault condition detection systems that are utilized to detect the existence of a potentially hazardous condition for a vehicle utilize one or more sensors for collecting data representing the operating conditions of the vehicle. After the sensors collect such data, a controller, such as a central processing unit, compares the collected data to predetermined threshold values and/or ranges in order to determine whether the vehicle is operating in a hazardous condition or may be soon operating in a hazardous condition.

If the controller determines, based on the comparison between the detected operating conditions and the predetermined threshold values and/or ranges of the operating conditions, that the vehicle is either operating in a hazardous condition or may be soon operating a hazardous condition, the controller outputs a warning to the operator of the vehicle which alerts the operator to a vehicle fault condition, and informs the operator of the actions which must be performed in order to manage the detected fault condition.

Thus, in the conventional system, in a situation in which there is only one fault condition detected for the vehicle, the controller outputs a warning to the operator which alerts the operator to the detected fault condition and informs the operator of the actions that must be performed in order to manage the fault. As such, in a situation in which there is only one detected vehicle fault condition, the conventional system can easily convey to the operator of the vehicle the necessary actions that need to be performed in order to manage the detected fault.

In the conventional system, however, a problem arises when multiple fault conditions of the vehicle are detected. In such a situation, the controller outputs a separate set of operator actions for each detected vehicle fault condition. Accordingly, if first and second fault conditions are detected, the controller outputs to the operator a first set of operator actions which inform the operator of the actions that must be performed in order to manage the first detected fault condition, as well as a second set of operator actions which inform the operator of the actions that must be performed in order to manage the second detected fault condition.

Thus, in the example above, in which first and second vehicle fault conditions are detected, it is possible that the operator actions associated with the first detected fault condition may conflict with the operator actions associated with the second detected fault condition. For example, a high hydraulic oil temperature fault has an associated operator action of "STOP, PARK, RUN ENGINE", whereas a high coolant temperature fault has an associated operator action of "STOP, PARK, SHUTDOWN ENGINE". In this case, performing the actions associated with the high hydraulic oil temperature fault and not shutting down the engine would result in severe damage to the engine.

Accordingly, in such a situation, by the operator carrying out the actions necessary to manage the first detected fault condition, the operator may actually be placing the vehicle in a more hazardous condition than if the operator had not performed such actions.

Further, in the conventional system, when multiple fault conditions are detected for a vehicle, the operator actions which must be performed in order to manage the faults are output to the operator of the vehicle based on the time of detection. However, in a situation in which a first one of the detected fault conditions is a non-critical fault condition, and a second one of the detected fault conditions is a critical fault condition, because the required operator actions necessary to manage the non-critical fault condition are output to the operator before the operator actions necessary to manage the critical fault condition, a dangerous situation can arise.

In particular, because the operator will likely perform the actions necessary to manage the non-critical fault condition prior to performing the steps necessary to manage the critical fault condition, such a delay in addressing the critical fault condition could place the vehicle, as well as the operator, in an extremely hazardous situation.

In view of the foregoing problems, what is needed is an operator alerting system which utilizes a vehicle fault prioritization scheme that prioritizes each of a plurality of vehicle fault conditions based on the operator actions which must be performed in order to manage the corresponding fault conditions, wherein the prioritization of the fault conditions enables the operator alerting system to output to the operator of the vehicle a single operator action instruction that when performed will manage all of the vehicle fault conditions.

SUMMARY OF THE INVENTION

Accordingly, it is a general objective of the present invention to provide a system for alerting an operator to only a highest priority vehicle fault condition by utilizing a prioritization method which is based on the required operator actions that are necessary to manage the vehicle fault conditions.

In the context of the present invention, the managing of a fault condition entails one or more of clearing the fault condition, rendering the fault condition non-critical, and reducing to the greatest extent possible vehicle hazards associated with the fault condition.

In an exemplary embodiment of the present invention, the vehicle fault conditions are prioritized based on the corresponding operator actions that are necessary to manage the fault conditions. In particular, for each possible combination of vehicle fault conditions, the fault conditions are prioritized such that either: (1) a fault condition is designated as a lower priority fault condition when the operator actions necessary to manage the fault condition are a subset of the operator actions necessary to manage at least one of the other fault conditions; (2) a fault condition is designated as a lower priority fault condition when performance of the operator actions necessary to manage one of the other fault conditions would change the designation of the fault condition from critical to non-critical; or (3) a fault condition is designated as a lower priority fault condition when the fault condition is designated as a non-critical fault condition.

By prioritizing fault conditions according to this scheme, when multiple fault conditions of the vehicle are detected, it is possible to output to the operator of the vehicle only the operator actions necessary to manage a single fault condition (i.e., the operator actions associated with the highest priority fault condition), thereby avoiding any potentially conflicting operator actions which could potentially place the vehicle and the operator in greater danger, while enabling the operator of the vehicle to manage all of the active fault conditions by performing only the operator actions associated with the highest priority fault condition.

The above and other features of the invention including various and novel details of construction and combination of parts will now be more fully described with reference to the accompanying drawings and pointed out in the claims. It will be understood that the particular features embodying the invention are shown by way of illustration only and not as a limitation of the invention. The principles and features of this invention may be employed in varied and numerous embodiments without departing from the scope of the invention.

BRIEF DESCRIPTION OF THE DRAWINGS

Aspects of illustrative, non-limiting embodiments of the present invention will become more apparent by describing in detail embodiments thereof with reference to the attached drawings in which:

FIG. 2 shows an example of a memory table for storing data regarding vehicle fault conditions.

DETAILED DESCRIPTION OF THE INVENTION

The following description of the invention discloses specific configurations, features, and operations. However, the description is merely of an example of the present invention, and thus, the specific features described below are merely used to more easily describe the invention and to provide an overall understanding of the present invention.

Accordingly, one skilled in the art will readily recognize that the present invention is not limited to the specific embodiments described below. Furthermore, the description of various configurations, features, and operations of the present invention that are known to one skilled in the art are omitted for the sake of clarity and brevity. Also, it is to be understood that the phraseology and terminology employed herein is for the purpose of description and should not be regarded as limiting.

Figure 1:
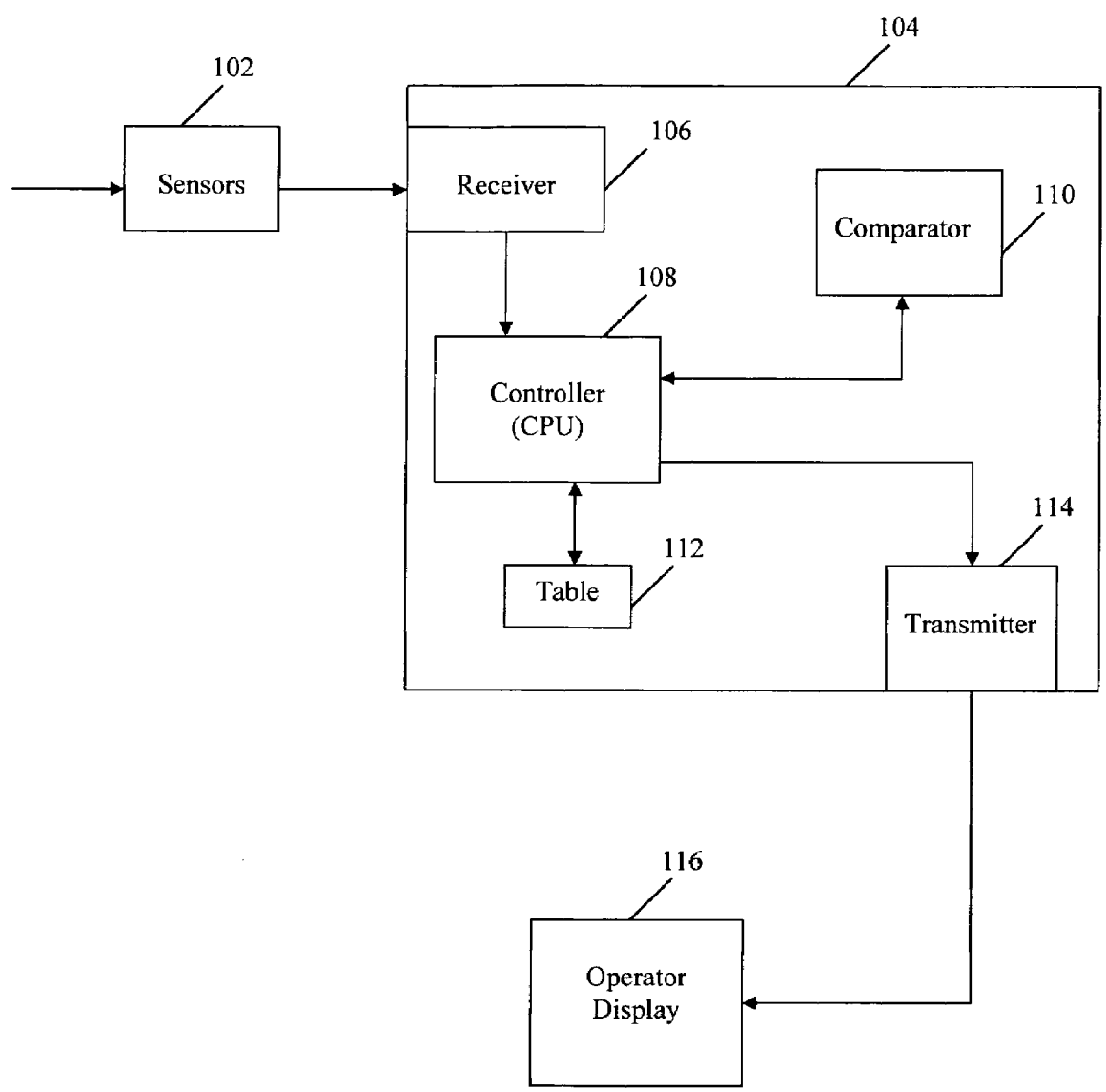
FIG. 1 is a block diagram showing an operator alerting system according to a first embodiment of the present invention.

In FIG. 1, an operator alerting system 104 of the present invention is shown which includes a receiver 106, a controller (CPU) 108, a comparator 110, a memory table 112 and a transmitter 114. As shown in FIG. 1, the controller 108 is connected to each of the receiver 106, the comparator 110, the memory table 112, and the transmitter 114, and is responsible for controlling the operation of the operator alerting system 104.

The one or more sensors 102 shown in FIG. 1 are responsible for continuously monitoring various operating conditions of a vehicle, and outputting the sensed data to the receiver 106. After receiving data from the sensors 102 representing various operating conditions of the vehicle, the receiver 106 transfers this data to the controller 108.

Examples of sensors 102 which may be provided to detect the operating conditions of the vehicle are conventional sensors such as a pressure sensor, a temperature sensor, a speed sensor, a level/tilt sensor, a current sensor, an inclinometer, a weight sensor, an oil pressure sensor, a brake pressure sensor, a tire pressure sensor, a pressure switch, a level switch and a GPS receiver.

As shown in FIG. 1, the table 112 is connected to the controller 108 and is responsible for storing data that is used in determining the presence of vehicle fault conditions and in determining which fault condition of a plurality of detected fault conditions has the highest priority.

In particular, the table 112 is responsible for storing data regarding a predetermined threshold and/or acceptable range for each of the operating conditions being sensed by the sensors 102. The predetermined thresholds and/or ranges stored in the table 112 represent normal operating conditions of the vehicle. Depending on the type of vehicle that is being monitored, the predetermined thresholds and/or ranges may need to be modified as desired by a user, whereby such modifications can be performed via a conventional input device and graphical user interface.

The table 112 is also responsible for storing a list of all possible fault conditions of the vehicle, and for each fault condition, the table 112 stores operator actions that are associated therewith, the operator actions being a list of one or more actions that must be performed by the operator of the vehicle in order to manage the corresponding vehicle fault condition (e.g., "STOP", "PARK", "SHUTDOWN").

Thus, when a vehicle is being monitored by the sensors 102, after collecting data representing the operating conditions of the vehicle, the sensors 102 output such data to the receiver 106, and the receiver 106 transfers the received data to the controller 108. By analyzing the received data, the controller 108 is able to identify the particular operating conditions to which the received data relates (e.g., oil pressure, vehicle inclination, engine temperature, etc.).

After identifying the particular operating conditions to which the received data relates, the controller accesses the table 112 so as to obtain the corresponding thresholds and/or ranges that are stored therein in advance. After retrieving the corresponding data from the table 112, the controller 108 transfers the data received from the sensors 102, along with the corresponding data retrieved from the table 112, to the comparator 110.

In the comparator 110, for each sensed condition of the vehicle, the received data is compared to the predetermined threshold and/or predetermined range that is predefined in the table 112, and a determination is made as to whether the received data exceeds the predetermined threshold and/or falls outside of the predetermined range. The comparator 110 then transfers the results of this determination to the controller 108.

For each sensed condition that is determined by the comparator 110 to either exceed its corresponding threshold or fall outside of its accepted range of normal operating conditions, the controller 108 accesses the data stored in the table 112 in order to determine the predefined fault condition that corresponds to the sensed condition.

In the table 112, for each predefined fault condition, there is a priority level associated therewith, as well as an indication as to whether the fault condition is a critical fault condition, which requires immediate correction due to the hazardous nature of the condition, or a non-critical fault condition, which does not require immediate attention by the operator.

Thus, for each fault condition, the table 112 stores the corresponding operator actions that must be performed in order to manage the fault condition, the priority of the fault condition, and whether the fault condition is critical or non-critical.

Accordingly, based on this information in the table 112, after the controller 108 identifies the detected fault condition having the highest priority, the controller sends a signal to the transmitter 114 instructing the transmitter 114 to output to an operator display 116 only the operator actions associated with the highest priority fault condition.

Regarding the priority of each vehicle fault condition, according to the present invention, the vehicle fault conditions are prioritized on the basis of the corresponding operator actions that are necessary to manage a respective fault condition. In particular, for each possible combination of vehicle fault conditions that can be detected for the vehicle, the fault conditions are prioritized such that either: (1) a fault condition is designated as a lower priority fault condition when the operator actions necessary to manage the fault condition are a subset of the operator actions necessary to manage at least one of the other fault conditions; (2) a fault condition is designated as a lower priority fault condition when performance of the operator actions necessary to manage one of the other fault conditions would change the designation of the fault condition from critical to non-critical; or (3) a fault condition is designated as a lower priority fault condition when the fault condition is designated as a non-critical fault condition.

By prioritizing fault conditions according to the scheme described above, and outputting to the operator only the operator actions associated with the highest priority detected fault condition, when multiple fault conditions of the vehicle are detected, it is possible for an operator of the vehicle to manage all of the detected fault conditions by performing only the operator actions that are necessary to manage the highest priority fault condition.

In other words, when multiple vehicle fault conditions are detected, because the vehicle fault conditions are prioritized in the manner described above, the performance of the operator actions associated with the detected vehicle fault condition having the highest priority will necessarily result in the managing of not only the highest priority detected fault condition, but in the managing of the lower priority detected fault conditions as well.

In addition, due to the fault prioritization scheme described above, the possibility of outputting conflicting operator actions which could potentially place the operator in greater danger is eliminated. Furthermore, there is never any chance that not outputting to the operator the corresponding operator actions for a lower priority fault condition will result in any damage or harm that could have otherwise been avoided, and therefore, the prioritization scheme according to the invention does not compromise safety in any manner.

An example of some of the data which may be stored in table 112 is shown in FIG. 2. The fault conditions "A" to "J" listed in FIG. 2 are prioritized using the above-described prioritization method such that only the operator actions associated with the highest priority of the detected fault conditions needs to be output to the operator. In particular, as described above, the vehicle fault conditions are prioritized in such a manner that the performance of the operator actions necessary to manage the highest priority detected fault conditions will necessarily result in the lower priority vehicle fault conditions being managed as well.

According to the present invention, if only a single vehicle fault condition is detected, then the system will immediately output to the operator the necessary actions that must be performed in order to manage the fault. However, if one or more other fault conditions are detected and the first vehicle fault detection has not cleared, then the above-described prioritization scheme is utilized in order to determine which operator actions should be output to the operator, namely, only the operator actions associated with the highest priority fault condition.

As an example of a situation in which the prioritization scheme of the present invention would be utilized is as follows. A "Low Steering Pressure" fault condition for the vehicle would be generated if the engine of the vehicle is running, which can be detected with a speed sensor, or if the vehicle is traveling faster than 0.5 mph, which can also be detected by a speed sensor, and the steering pressure, which is detected with a pressure switch, is below the predetermined threshold value stored in the table 112, and these conditions are true for one second.

The operator action associated with this fault condition is "STOP", which means that the operator should immediately stop the truck, and then wait for the steering pressure to rise. If the steering pressure rises to a level that is above the predetermined threshold, then the fault will clear and then the vehicle can be operated again safely. However, if a second fault condition, "Brake Malfunction", is detected before the "Low Steering Pressure" fault condition is cleared, then it must be determined, as described above, which fault condition is the highest priority fault condition.

In this example, the corresponding operator actions for the "Brake Malfunction" fault condition are "STOP, PARK, SHUTDOWN, AND SECURE THE VEHICLE", and therefore, this fault condition is higher in priority than the "Low Steering Pressure" fault condition, which has an associated operator action of "STOP". Accordingly, in this case, the operator action of "STOP", which was associated with the "Low Steering Pressure" fault condition and was displayed to the operator, will be replaced with "STOP, PARK, SHUTDOWN, AND SECURE THE VEHICLE".

Thus, as is evident from this example, when the operator of the vehicle completes the actions required by the "Brake Malfunction" fault condition (i.e., stop the vehicle, park the vehicle, shutdown the vehicle, and secure the vehicle), the operator also completes the actions required by "Low Steering Pressure" fault condition (i.e., stop the vehicle). Accordingly, due to the prioritization scheme utilized in this invention, there is no increased danger to the operator or the vehicle by not presenting the operator action associated with the lower priority fault condition of "Low Steering Pressure".

In other words, in this example, because the operator actions associated with the lower priority fault condition (i.e., "STOP") are a subset of the operator actions associated with the higher priority fault condition (i.e., "STOP, PARK, SHUTDOWN, AND SECURE THE VEHICLE"), it is only necessary to display the required operator actions for the higher priority fault condition.

As another example, a "Hydraulic Oil Filter Restriction" fault has an associated operator action of "GO TO SHOP NOW". If the "Brake Malfunction" fault was to become active while the "Hydraulic Oil Filter Restriction" fault was active, then performing the "STOP, PARK, SHUTDOWN, AND SECURE THE VEHICLE" operator action associated with the "Brake Malfunction" fault would make the "Hydraulic Oil Filter Restriction" fault non-critical as damage due to this condition is not possible when the engine is not running. Accordingly, when both of these faults are detected, only the operator action associated with "brake malfunction" fault condition are output to the operator.

As should be evident from the description above, the sensors 102 continuously monitor the operating conditions of the vehicle and, therefore, the receiver 106, controller 108, comparator 110 and table 112 are continuously operating so as to determine whether any fault conditions of the vehicle are present.

Figure 3:
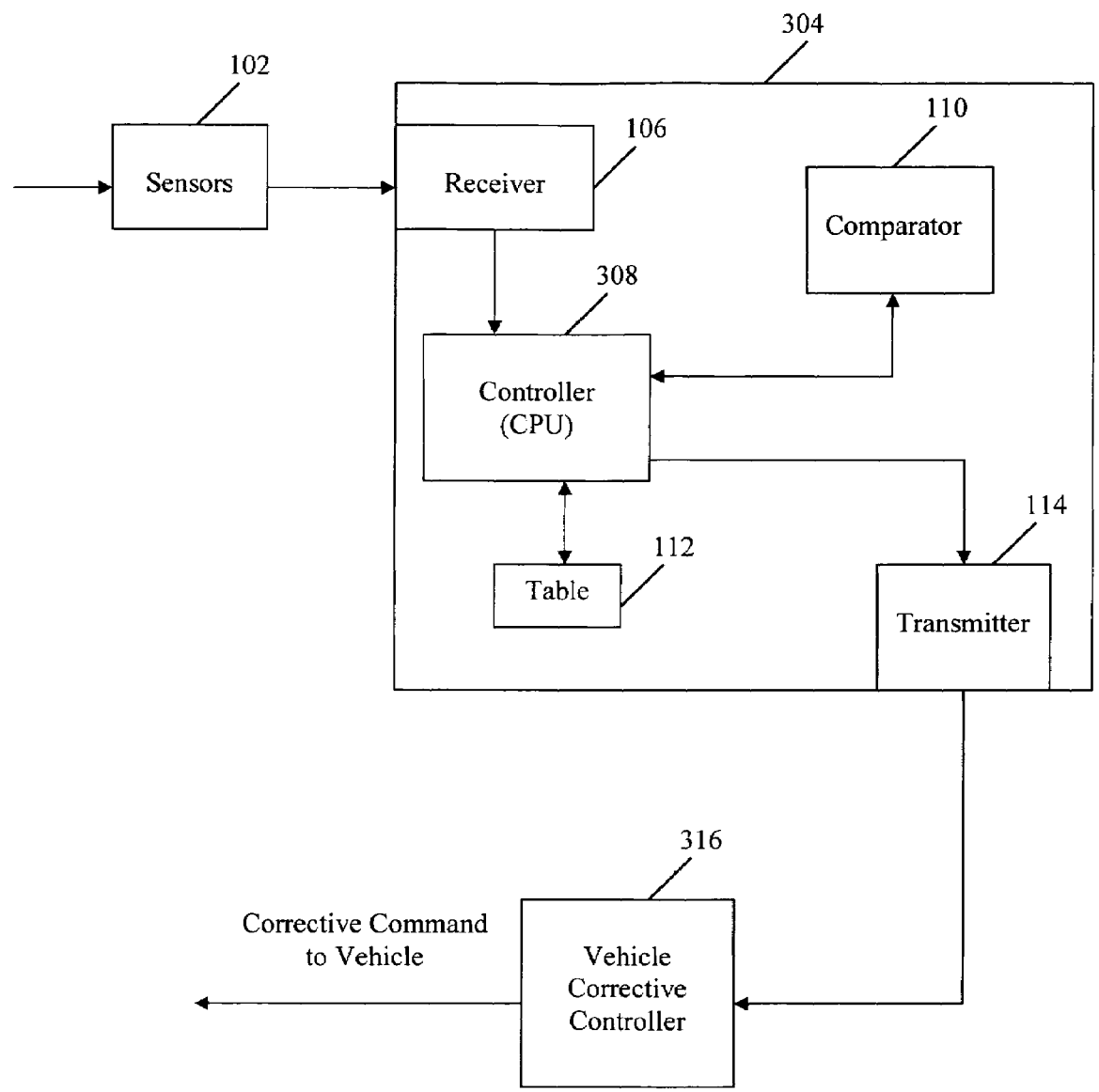
FIG. 3 is a block diagram showing an operator alerting system according to a second embodiment of the present invention.

In an alternative embodiment shown in FIG. 3, the same prioritization vehicle fault prioritization method as that described above is utilized, but instead of outputting the operator actions associated with the highest priority fault condition to a display that the operator can view, the fault detection system 304 outputs the operator actions associated with the highest priority fault condition to a vehicle corrective controller 316, which is able to automatically control the vehicle so as to perform the operator actions which correspond to the highest priority fault condition.

For example, if the signals output by the sensors (e.g., tilt/level sensors and speed sensors) indicate to the controller 308 that the vehicle is in danger of a potential rollover scenario, the controller 308 will output a signal to the vehicle corrective controller 316 indicating the actions that need to take place, and the vehicle corrective controller 316 will automatically control the vehicle so as to carry out the required actions in an attempt to prevent the vehicle from undergoing a rollover. Such measures could include restricting or preventing the flow of fuel, or interrupting the power that is supplied from the vehicle's battery.

It is to be understood that the various sensors described above for detecting the operating conditions of the vehicle are merely examples of sensors that can be used in the present invention. Those of ordinary skill in the art will recognize that other types of sensors can be provided for detecting any type of operating condition that would be beneficial in providing data for detecting fault conditions of the vehicle.

In addition, while the operator display is preferably located in the vehicle in the first exemplary embodiment described herein, the location of the operator display is not limited to the vehicle, but instead, could be located remotely from the vehicle. If the operator display is located remotely from the vehicle, then the display would be provided with conventional functionality to receive signals wirelessly from the transmitter 114.

The previous description is provided to enable a person skilled in the art to make and use the present invention. Moreover, various modifications to the illustrative embodiments above will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A method for alerting an operator of a vehicle to a highest priority vehicle fault condition of a plurality of vehicle fault conditions, the method comprising:
    detecting a plurality of operating conditions of the vehicle;
    comparing each of the detected operating conditions of the vehicle to a corresponding predetermined threshold for each of the plurality of operating conditions;
    detecting more than one vehicle fault condition when the comparison between each of the detected operating conditions of the vehicle and the corresponding predetermined threshold for each of the plurality of operating conditions results in more than one vehicle operating condition exceeding its predetermined threshold; and
    identifying a priority level for each of the detected vehicle fault conditions when more than one vehicle fault condition is detected;
    wherein each of the plurality of vehicle fault conditions has a predetermined operator action associated therewith;
    wherein the priority level for each of the plurality of detected vehicle fault conditions is designated based on the predetermined operator action associated with each of the plurality of vehicle fault conditions; and
    wherein, when more than one vehicle fault condition is detected, the operator action that is associated with the detected vehicle fault condition having the highest priority among the plurality of detected vehicle fault conditions is the only operator action output to the operator of the vehicle.

2. The method according to claim 1,
    wherein said detecting more than one vehicle fault condition comprises:
    detecting a first vehicle fault condition of the plurality of vehicle fault conditions, the first vehicle fault condition having a first operator action associated therewith, wherein the first operator action includes one or more actions that are necessary to be performed by the operator in order to manage the first vehicle fault condition; and
    detecting a second vehicle fault condition of the plurality of vehicle fault conditions, the second vehicle fault condition having a second operator action associated therewith, wherein the second operator action includes one or more operator actions that are necessary to be carried out in order manage the second vehicle fault condition.

3. The method according to claim 2,
    wherein the priority level of each of the plurality of vehicle fault conditions is designated by comparing the first operator action with the second operator action,
    wherein, if the one or more actions of the first operator action are a subset of the one or more actions of the second operator action, then the second vehicle fault condition is assigned a higher priority than the first vehicle fault condition, and
    wherein, if the one or more actions of the second operator action are a subset of the one or more actions of the first operator action, then the first vehicle fault condition is assigned a higher priority than the second vehicle fault condition.

4. The method according to claim 3,
    wherein, if performing the one or more actions of the first operator action would cause the second vehicle fault condition to change from a critical fault condition to a non-critical vehicle fault condition, then the first vehicle fault condition is assigned a higher priority than the second vehicle fault condition, and
    wherein, if performing the one or more actions of the second operator action would cause the first vehicle fault condition to change from a critical fault condition to a non-critical fault condition, then the second vehicle fault condition is assigned a higher priority than the first vehicle fault condition.

5. The method according to claim 2,
    wherein the priority level of each of the plurality of vehicle fault conditions is designated by comparing the first operator action with the second operator action,
    wherein, if performing the one or more actions of the first operator action would cause the second vehicle fault condition to change from a critical fault condition to a non-critical vehicle fault condition, then the first vehicle fault condition is assigned a higher priority than the second vehicle fault condition, and
    wherein, if performing the one or more actions of the second operator action would cause the first vehicle fault condition to change from a critical fault condition to a non-critical fault condition, then the second vehicle fault condition is assigned a higher priority than the first vehicle fault condition.

6. The method according to claim 1, wherein the priority level for each of the plurality of detected fault conditions is designated such that all of the detected fault conditions will be managed upon performance of the operator action that is associated with the detected vehicle fault condition having the highest priority among the plurality of detected vehicle fault conditions.

7. A method for prioritizing fault conditions of a vehicle, the method comprising:
identifying a plurality of vehicle fault conditions that can be sensed based on operating conditions of the vehicle;
associating, with each of the plurality of vehicle fault conditions, a required operator action that is necessary to manage the corresponding vehicle fault condition; and
prioritizing the plurality of vehicle fault conditions based on the required operator action associated with each of the plurality of vehicle fault conditions;
wherein said identifying the plurality of fault conditions comprises:
identifying a first fault condition of the plurality of vehicle fault conditions, the first vehicle fault condition having a first operator action associated therewith, wherein the first operator action includes one or more actions that are necessary to be performed by the operator in order to manage the first vehicle fault condition; and
identifying a second fault condition of the plurality of vehicle fault conditions, the second fault condition having a second operator action associated therewith, wherein the second operator action includes one or more actions that are necessary to be performed by the operator in order manage the second vehicle fault condition; and
wherein said prioritizing the plurality of vehicle fault conditions comprises comparing the one or more actions of the first operator action associated with the first vehicle fault condition to the one or more actions of the second operator action associated with the second vehicle fault condition.

8. The method according to claim 7,
wherein said prioritizing the plurality of vehicle fault conditions further comprises:
assigning the first vehicle fault condition to have a higher priority than the second vehicle fault condition if the one or more actions of the second operator action are a subset of the one or more actions of the first operator action; and
assigning the second vehicle fault condition to have a higher priority than the first vehicle fault condition if the one or more actions of the first operator action are a subset of the one or more actions of the second operator action.

9. The method according to claim 8,
wherein said prioritizing the plurality of vehicle fault conditions further comprises:
assigning the first vehicle fault condition to have a higher priority than the second vehicle fault condition if performing the one or more actions of the first operator action would cause the second vehicle fault condition to change from a critical fault condition to a non-critical fault condition; and
assigning the second vehicle fault condition to have a higher priority than the first vehicle fault condition if performing the one or more actions of the second operator action would cause the first vehicle fault condition to change from a critical fault condition to a non-critical fault condition.

10. The method according to claim 7,
wherein said prioritizing the plurality of vehicle fault conditions further comprises:
assigning the first vehicle fault condition to have a higher priority than the second vehicle fault condition if performing the one or more actions of the first operator action would cause the second vehicle fault condition to change from a critical fault condition to a non-critical fault condition; and
assigning the second vehicle fault condition to have a higher priority than the first vehicle fault condition if performing the one or more actions of the second operator action would cause the first vehicle fault condition to change from a critical fault condition to a non-critical fault condition.

11. The method according to claim 7, wherein the plurality of vehicle fault conditions are prioritized such that performance of the required operator action associated with a highest priority vehicle fault condition of the plurality of vehicle fault conditions results in all of the vehicle fault conditions being managed.

12. A system for alerting an operator of a vehicle to a highest priority vehicle fault condition of a plurality of vehicle fault conditions, the system comprising:
a controller operable to receive information regarding a plurality of operating conditions of the vehicle from one or more sensors;
a memory table for storing data regarding a predetermined threshold for each of the plurality of operating conditions of the vehicle; and
a comparator operable to compare the information regarding each of the operating conditions of the vehicle received by the controller to the corresponding predetermined threshold for each of the plurality of operating conditions;
wherein the controller detects more than one vehicle fault condition when the comparison between the information regarding each of the detected operating conditions of the vehicle and the corresponding predetermined threshold for each of the plurality of operating conditions results in more than one vehicle operating condition exceeding its predetermined threshold;
wherein the controller identifies a priority level for each of the detected vehicle fault conditions when more than one vehicle fault condition is detected;
wherein each of the plurality of vehicle fault conditions has a predetermined operator action associated therewith;
wherein the priority level for each of the plurality of vehicle fault conditions is designated based on the predetermined operator action associated with each of the plurality of vehicle fault conditions; and
wherein, when more than one vehicle fault condition is detected, the controller causes the operator action that is associated with the detected vehicle fault condition having the highest priority among the plurality of detected vehicle fault conditions to be the only operator action output to the operator of the vehicle.

13. The system according to claim 12,
wherein the more than one vehicle fault conditions detected by the controller comprise:
a first vehicle fault condition of the plurality of vehicle fault conditions, the first vehicle fault condition having a first operator action associated therewith, wherein the first operator action includes one or more actions that are necessary to be performed by the operator in order to manage the first vehicle fault condition; and
a second vehicle fault condition of the plurality of vehicle fault conditions, the second vehicle fault condition having a second operator action associated therewith, wherein the second operator action includes one or more actions that are necessary to be performed by the operator in order manage the second vehicle fault condition.

14. The system according to claim 13,
wherein the priority level of each of the plurality of vehicle fault conditions is designated based on a comparison between the first operator action and the second operator action,
wherein, if the one or more actions of the first operator action are a subset of the one or more actions of the second operator action, then the second vehicle fault condition is assigned a higher priority than the first vehicle fault condition, and
wherein, if the one or more actions of the second operator action are a subset of the one or more actions of the first operator action, then the first vehicle fault condition is assigned a higher priority than the second vehicle fault condition.

15. The system according to claim 14,
wherein, if performance of the one or more actions of the first operator action would cause the second vehicle fault condition to change from a critical fault condition to a non-critical vehicle fault condition, then the first vehicle fault condition is assigned a higher priority than the second vehicle fault condition, and
wherein, if performance of the one or more actions of the second operator action would cause the first vehicle fault condition to change from a critical fault condition to a non-critical fault condition, then the second vehicle fault condition is assigned a higher priority than the first vehicle fault condition.

16. The system according to claim 13,
wherein the priority level of each of the plurality of vehicle fault conditions is designated based on a comparison between the first operator action and the second operator action,
wherein, if performance of the one or more actions of the first operator action would cause the second vehicle fault condition to change from a critical fault condition to a non-critical vehicle fault condition, then the first vehicle fault condition is assigned a higher priority than the second vehicle fault condition, and
wherein, if performance of the one or more actions of the second operator action would cause the first vehicle fault condition to change from a critical fault condition to a non-critical fault condition, then the second vehicle fault condition is assigned a higher priority than the first vehicle fault condition.

17. The system according to claim 12, wherein the priority level for each of the plurality of detected fault conditions is designated such that all of the detected fault conditions will be managed upon performance of the operator action that is associated with the detected vehicle fault condition having the highest priority among the plurality of detected vehicle fault conditions.

* * * * *